US012580387B2

(12) United States Patent
Wang et al.

(10) Patent No.: US 12,580,387 B2
(45) Date of Patent: Mar. 17, 2026

(54) POWER CONVERTER AND METHOD FOR CONTROLLING POWER CONVERTER

(71) Applicant: Huawei Digital Power Technologies Co., Ltd., Shenzhen (CN)

(72) Inventors: Xiongfei Wang, Shenzhen (CN); Teng Liu, Shenzhen (CN); Mingquan Zhao, Shanghai (CN); Meiqing Zhang, Shanghai (CN); Kai Xin, Shanghai (CN); Yunfeng Liu, Shanghai (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/887,314

(22) Filed: Sep. 17, 2024

(65) Prior Publication Data

US 2025/0105625 A1 Mar. 27, 2025

(30) Foreign Application Priority Data

Sep. 22, 2023 (CN) .......................... 202311241570.5

(51) Int. Cl.
*H02J 3/32* (2006.01)
*H02J 3/1835* (2026.01)
(Continued)

(52) U.S. Cl.
CPC .............. *H02J 3/1835* (2013.01); *H02J 3/32* (2013.01); *H02M 1/0016* (2021.05); *H02J 2203/20* (2020.01)

(58) Field of Classification Search
CPC ........ H02J 3/1835; H02J 3/32; H02J 2203/20; H02J 2300/24; H02J 3/48; H02J 3/50; H02M 1/0016
(Continued)

(56) References Cited

FOREIGN PATENT DOCUMENTS

| CN | 101860038 A | 10/2010 |
| CN | 102904272 A | 1/2013 |

(Continued)

OTHER PUBLICATIONS

Zhao et al. "Stability enhancement strategies for a 100% grid-forming and grid-following converter-based Irish power system"; Nov. 30, 2021; pp. 125-138. (Year: 2021).*
(Continued)

*Primary Examiner* — Rexford N Barnie
*Assistant Examiner* — Xuan Ly
(74) *Attorney, Agent, or Firm* — Maier & Maier, PLLC

(57) ABSTRACT
A power converter and a method. When the voltage at the grid connection point exceeds the preset voltage range and an amplitude of a voltage output by the power conversion circuit is not greater than a voltage threshold, embodiments can control the amplitude of the current output by the power conversion circuit to be not greater than a second current threshold, where the second current threshold is greater than the first current threshold, and a ratio of an active current to a reactive current output by the power conversion circuit is constant or changes; or, when the amplitude of the voltage output by the power conversion circuit is greater than the voltage threshold, embodiments can control the amplitude of the current output by the power conversion circuit to be equal to the second current threshold, where the ratio of the active current to the reactive current changes.

19 Claims, 5 Drawing Sheets

(51) Int. Cl.
    *H02J 3/48*        (2006.01)
    *H02J 3/50*        (2006.01)
    *H02M 1/00*      (2006.01)

(58) Field of Classification Search
    USPC ........................................................ 307/24
    See application file for complete search history.

(56)               References Cited

FOREIGN PATENT DOCUMENTS

| CN | 104578736 A | 4/2015 |
|----|-------------|--------|
| CN | 106655272 A | 5/2017 |
| CN | 114050561 A | 2/2022 |

OTHER PUBLICATIONS

Zhao et al., "Stability Enhancement Strategies for a 100% Grid-Forming and Grid-Following Converter-Based Irish Power System", IET Renewable Power Generation, The Authors, John Wiley & Sons Ltd on behalf of The Institution of Engineering and Technology, XP006114460, ISSN: 1752-1416, Nov. 30, 2021, vol. 16, No. 1, pp. 125-138.

* cited by examiner

POWER CONVERTER AND METHOD FOR CONTROLLING POWER CONVERTER

CROSS-REFERENCE TO RELATED APPLICATION

This application claims priority to Chinese Patent Application No. 202311241570.5, filed on Sep. 22, 2023, which is hereby incorporated by reference in its entirety.

TECHNICAL FIELD

The embodiments relate to the power electronics field and to a power converter and a method for controlling a power converter.

BACKGROUND

A grid-forming power converter is a power converter designed based on a grid-forming control policy, and is applicable to a grid power supply scenario without stable voltage reference. The grid-forming power converter is represented as a voltage source in a power system, and can provide voltage and frequency support and respond quickly to a fault event of a grid. Because of a voltage source characteristic of the grid-forming power converter, a rapid increase in a current of the power converter that is caused by a grid fault may lead to a rapid increase in an output current, and therefore an overcurrent phenomenon may easily occur. However, a grid-forming power converter that is based on a semiconductor power device has a poor overcurrent capability, and can provide and withstand a very limited short-circuit current. If no control measure is taken after a protection current is exceeded, the power device in the power converter may be overheated or fail, or there is even a risk of explosion or burning of the power converter. In a current grid-forming power converter, current limiting can be performed by switching a control type. For example, when a fault is detected, the power converter switches to a grid following mode or directly disconnects from a grid. However, this current limiting mode clearly has no advantage of grid-forming control.

Therefore, how to enable a grid-forming power converter to maintain a grid-forming capability during a transient state without causing an overcurrent risk and fully use an overcurrent capability of a semiconductor device of the power converter is a problem that urgently needs to be resolved.

SUMMARY

Embodiments provide a power converter and a method for controlling a power converter. In this way, in a current limiting process, voltage support can still be provided for an alternating current grid, and a grid-forming capability of the power converter can be maintained, enhancing reliability of grid power supply is high.

According to a first aspect, the embodiments provide a power converter. The power converter includes a controller and a power conversion circuit, an input of the power conversion circuit is connected to a direct current power supply, an output of the power conversion circuit is coupled to an alternating current grid through a grid connection point, and the power conversion circuit is configured to output an alternating current to the alternating current grid. The controller is configured to: when a voltage at the grid connection point is within a preset voltage range, control the power converter to work in a steady-state mode, where in the steady-state mode, an amplitude of a current output by the power conversion circuit is not greater than a first current threshold; or when the voltage at the grid connection point exceeds the preset voltage range: in response to that an amplitude of a voltage output by the power conversion circuit is not greater than a voltage threshold, control the power converter to work in a transient voltage stabilization mode, where in the transient voltage stabilization mode, the amplitude of the current output by the power conversion circuit is not greater than a second current threshold, the second current threshold is greater than the first current threshold, and a ratio of an active current to a reactive current output by the power conversion circuit is constant or changes; or in response to that the amplitude of the voltage output by the power conversion circuit is greater than the voltage threshold, control the power converter to work in a transient voltage regulation mode, where in the transient voltage regulation mode, the amplitude of the current output by the power conversion circuit is equal to the second current threshold, and the ratio of the active current to the reactive current output by the power conversion circuit changes.

In the embodiments, in a working process of the power converter, the controller in the power converter may provide voltage support for the alternating current grid in response to voltage fluctuation of the alternating current grid when the voltage at the grid connection point exceeds the preset voltage range, in other words, when a power system is in a transient state. For example, in response to that the amplitude of the voltage output by the power conversion circuit is greater than the voltage threshold, the controller may control the power converter to work in the transient voltage regulation mode. In the transient voltage regulation mode, the controller controls the amplitude of the current output by the power conversion circuit to be equal to the second current threshold, and adjusts an output virtual impedance of the power conversion circuit to adjust the ratio of the active current to the reactive current output by the power conversion circuit to change, so that a change amplitude of the amplitude of the voltage output by the power conversion circuit decreases, and therefore a change amplitude of a voltage of the grid decreases. In this way, in a current limiting process, voltage support can still be provided for the alternating current grid, and a grid-forming capability of the power converter can be maintained. In addition, the power converter can also meet a current limiting requirement without reserving a specific current margin, and an overcurrent capability of the power converter is more fully utilized.

In a possible implementation, the controller is configured to: in response to that the amplitude of the voltage output by the power conversion circuit is greater than the voltage threshold, control the power converter to work in the transient voltage regulation mode; and in the transient voltage regulation mode: if an absolute value of a difference between the amplitude of the voltage output by the power conversion circuit and the voltage threshold increases, control the ratio of the active current to the reactive current to decrease; or if an absolute value of a difference between the amplitude of the voltage output by the power conversion circuit and the voltage threshold decreases, control the ratio of the active current to the reactive current to increase. In the current limiting process, the power converter can still provide voltage support for the alternating current grid, and the grid-forming capability of the power converter can be maintained, enhancing reliability of grid power supply is high.

In a possible implementation, the direct current power supply includes an energy storage battery, and the controller is configured to: in response to that the power converter outputs an alternating current to the alternating current grid based on a direct current output by the energy storage battery, and the amplitude of the voltage output by the power conversion circuit is greater than the voltage threshold, control the power converter to work in the transient voltage regulation mode; and in the transient voltage regulation mode: if an absolute value of a difference between the amplitude of the voltage output by the power conversion circuit and the voltage threshold increases, control the ratio of the active current to the reactive current to decrease; or if an absolute value of a difference between the amplitude of the voltage output by the power conversion circuit and the voltage threshold decreases, control the ratio of the active current to the reactive current to increase. When photovoltaic and energy storage batteries supply power at the same time, in the current limiting process, the power converter can still provide voltage support for the alternating current grid, and the grid-forming capability of the power converter can be maintained, enhancing reliability of grid power supply is high.

In a possible implementation, the direct current power supply includes an energy storage battery, and the controller is configured to: in response to that the power converter outputs a direct current to the energy storage battery based on an alternating current output by the alternating current grid, and the amplitude of the voltage output by the power conversion circuit is greater than the voltage threshold, control the power converter to work in the transient voltage regulation mode; and in the transient voltage regulation mode: if an absolute value of a difference between the amplitude of the voltage output by the power conversion circuit and the voltage threshold increases, control the ratio of the active current to the reactive current to increase; or if an absolute value of a difference between the amplitude of the voltage output by the power conversion circuit and the voltage threshold decreases, control the ratio of the active current to the reactive current to decrease. When photovoltaic and energy storage batteries supply power at the same time, in the current limiting process, the power converter can still provide voltage support for the alternating current grid, and the grid-forming capability of the power converter can be maintained, enhancing reliability of grid power supply is high.

In a possible implementation, the controller is configured to: generate a first current instruction through a voltage loop based on the voltage output by the power conversion circuit and an initial voltage instruction; and in response to that an amplitude of the first current instruction is greater than a current instruction threshold and the amplitude of the first current instruction decreases, control an output virtual impedance of the power conversion circuit to decrease; or in response to that the amplitude of the first current instruction is greater than the current instruction threshold and the amplitude of the first current instruction increases, control an output virtual impedance of the power conversion circuit to increase, to update the initial voltage instruction based on a decreased or increased virtual impedance; generate, through a circular limiter based on the first current instruction, a second current instruction whose amplitude is the current instruction threshold, and input the second current instruction into a current loop, where a ratio of an active current to a reactive current in the first current instruction is the same as a ratio of an active current to a reactive current in the second current instruction; and generate, through the current loop based on the second current instruction and the current output by the power conversion circuit, a modulation voltage signal to control the power conversion circuit. The second current instruction obtained after amplitude adjustment is performed based on the first current instruction may be represented as:

$$\mathrm{Iodq\_lim} = K_{lim} \cdot \mathrm{Iodq\_ref}.$$

Iodq_ref is the first current instruction generated by the voltage loop, and $K_{lim}$ is an overcurrent ratio and may be represented as:

$$K_{lim} = \begin{cases} 1, & \|\mathrm{Iodq\_ref}\| < I_{lim} \\ \dfrac{I_{lim}}{\|\mathrm{Iodq\_ref}\|}, & \|\mathrm{Iodq\_ref}\| \geq I_{lim} \end{cases}.$$

Herein, in an aspect, the power converter may limit the output current; and in another aspect, the power converter may generate a current instruction through the voltage loop based on the output voltage of the power conversion circuit. Fluctuation of the output voltage of the power conversion circuit causes a change of a ratio of an active current to a reactive current in the generated current instruction, and change information of the ratio of the active current to the reactive current is maintained while the circular limiter is used for current limiting, so that the power converter maintains a capability of responding to fluctuation of the amplitude of the voltage output by the power conversion circuit.

In a possible implementation, the controller is configured to: adjust an output virtual inductive reactance of the power conversion circuit, to enable a ratio of the virtual inductive reactance to a virtual inductive reactance reference value to be a difference between 1 and an overcurrent ratio, where the overcurrent ratio is equal to a ratio of the current instruction threshold to the amplitude of the first current instruction, and the output virtual inductive reactance is an imaginary part of the output virtual impedance; and adjust an output virtual resistance of the power conversion circuit, to enable a ratio of the virtual resistance to the virtual inductive reactance to be equal to a preset ratio or a preset expression, where the output virtual resistance is a real part of the output virtual impedance.

In a possible implementation, the preset ratio is a negative ratio of the active current to the reactive current output by the power conversion circuit, or a negative ratio of an active current instruction to a reactive current instruction in the second current instruction.

Herein, the virtual inductive reactance $X_v$ may be represented as:

$$X_v = (1 - K_{lim}) \cdot X_o.$$

$X_o$ is the virtual inductive reactance reference value, and $K_{lim}$ is the overcurrent ratio. The controller may adjust a virtual resistance between the power conversion circuit and a filter inductor, to enable the ratio of the virtual resistance to the virtual inductive reactance to be equal to the negative ratio of the output active current to the output reactive current of the power conversion circuit, that is, the virtual resistance $R_v$ may be represented as:

$$R_v = \left(-\frac{Iod}{Ioq}\right) \cdot X_v.$$

Iod and Ioq are respectively the active current and the reactive current that are output by the power conversion circuit. Further, the controller may update, based on an adjusted virtual impedance, a voltage instruction input into the voltage loop, where $$\text{Vpccd\_ref\_new} = \text{Vpccd\_ref} - Iod \cdot R_v + Ioq \cdot X_v; \text{ and}$$

$$\text{Vpccq\_ref\_new} = \text{Vpccq\_ref} - Ioq \cdot R_v - Iod \cdot X_v.$$

Vpccd_ref is an active voltage in the voltage instruction, Vpccq_ref is a reactive voltage in the voltage instruction, Vpccd_ref_new is an active voltage in an updated voltage instruction, and Vpccq_ref_new is a reactive voltage in the updated voltage instruction. The controller may update, based on the adjusted virtual impedance, the voltage instruction input into the voltage loop, so that the voltage loop generates a new current instruction based on the output voltage of the power conversion circuit and the updated voltage instruction.

In a possible implementation, the controller is configured to: in response to that the amplitude of the first current instruction is not greater than the current instruction threshold, control the output virtual impedance of the power conversion circuit to be zero.

According to a second aspect, the embodiments provide a method for controlling a power converter, where the power converter includes a power conversion circuit, an input of the power conversion circuit is configured to connect to a direct current power supply, an output of the power conversion circuit is coupled to an alternating current grid through a grid connection point, and the power conversion circuit is configured to output an alternating current to the alternating current grid; and the method includes: when a voltage at the grid connection point is within a preset voltage range, controlling the power converter to work in a steady-state mode, where in the steady-state mode, an amplitude of a current output by the power conversion circuit is not greater than a first current threshold; or when the voltage at the grid connection point exceeds the preset voltage range: in response to that an amplitude of a voltage output by the power conversion circuit is not greater than a voltage threshold, controlling the power converter to work in a transient voltage stabilization mode, where in the transient voltage stabilization mode, the amplitude of the current output by the power conversion circuit is not greater than a second current threshold, the second current threshold is greater than the first current threshold, and a ratio of an active current to a reactive current output by the power conversion circuit is constant or changes; or in response to that the amplitude of the voltage output by the power conversion circuit is greater than the voltage threshold, controlling the power converter to work in a transient voltage regulation mode, where in the transient voltage regulation mode, the amplitude of the current output by the power conversion circuit is identically equal to the second current threshold, and the ratio of the active current to the reactive current output by the power conversion circuit changes.

In the embodiments, in a working process of the power converter, in response to that the amplitude of the voltage output by the power conversion circuit is greater than the voltage threshold, the power converter may control, through the controller, the power converter to work in the transient voltage regulation mode. In the transient voltage regulation mode, the power converter controls the amplitude of the current output by the power conversion circuit to be equal to the second current threshold, and adjusts an output virtual impedance of the power conversion circuit to adjust the ratio of the active current to the reactive current output by the power conversion circuit to change, so that a change amplitude of the amplitude of the voltage output by the power conversion circuit decreases, and therefore a change amplitude of a voltage of the grid decreases. In this way, in a current limiting process, voltage support can still be provided for the alternating current grid, and a grid-forming capability of the power converter can be maintained. In addition, the power converter can also meet a current limiting requirement without reserving a specific current margin, and an overcurrent capability of the power converter is more fully utilized.

In a possible implementation, the method includes: in response to that the amplitude of the voltage output by the power conversion circuit is greater than the voltage threshold, controlling the power converter to work in the transient voltage regulation mode; and in the transient voltage regulation mode: if an absolute value of a difference between the amplitude of the voltage output by the power conversion circuit and the voltage threshold increases, controlling the ratio of the active current to the reactive current to decrease; or if an absolute value of a difference between the amplitude of the voltage output by the power conversion circuit and the voltage threshold decreases, controlling the ratio of the active current to the reactive current to increase. In the current limiting process, the power converter can still provide voltage support for the alternating current grid, and the grid-forming capability of the power converter can be maintained, enhancing reliability of grid power supply is high.

In a possible implementation, the direct current power supply includes an energy storage battery, and the method includes: in response to that the power converter outputs an alternating current to the alternating current grid based on a direct current output by the energy storage battery, and the amplitude of the voltage output by the power conversion circuit is greater than the voltage threshold, controlling the power converter to work in the transient voltage regulation mode; and in the transient voltage regulation mode: if an absolute value of a difference between the amplitude of the voltage output by the power conversion circuit and the voltage threshold increases, controlling the ratio of the active current to the reactive current to decrease; or if an absolute value of a difference between the amplitude of the voltage output by the power conversion circuit and the voltage threshold decreases, controlling the ratio of the active current to the reactive current to increase. When photovoltaic and energy storage batteries supply power at the same time, in the current limiting process, the power converter can still provide voltage support for the alternating current grid, and the grid-forming capability of the power converter can be maintained, enhancing reliability of grid power supply is high.

In a possible implementation, the direct current power supply includes an energy storage battery, and the method includes: in response to that the power converter outputs a direct current to the energy storage battery based on an alternating current output by the alternating current grid, and the amplitude of the voltage output by the power conversion circuit is greater than the voltage threshold, controlling the power converter to work in the transient voltage regulation mode; and in the transient voltage regulation mode: if an absolute value of a difference between the amplitude of the voltage output by the power conversion circuit and the voltage threshold increases, controlling the ratio of the active current to the reactive current to increase; or if an absolute value of a difference between the amplitude of the voltage output by the power conversion circuit and the voltage threshold decreases, controlling the ratio of the active current to the reactive current to decrease. When photovoltaic and energy storage batteries supply power at the same time, in the current limiting process, the power converter can still provide voltage support for the alternating current grid, and the grid-forming capability of the power converter can be maintained, enhancing reliability of grid power supply is high.

In a possible implementation, the method includes: generating a first current instruction through a voltage loop based on the voltage output by the power conversion circuit and an initial voltage instruction; and in response to that an amplitude of the first current instruction is greater than a current instruction threshold and the amplitude of the first current instruction decreases, controlling an output virtual impedance of the power conversion circuit to decrease; or in response to that the amplitude of the first current instruction is greater than the current instruction threshold and the amplitude of the first current instruction increases, controlling the output virtual impedance of the power conversion circuit to increase, to update the initial voltage instruction based on a decreased or increased virtual impedance; generating, through a circular limiter based on the first current instruction, a second current instruction whose amplitude is the current instruction threshold, and inputting the second current instruction into a current loop, where a ratio of an active current to a reactive current in the first current instruction is the same as a ratio of an active current to a reactive current in the second current instruction; and generating, through the current loop based on the second current instruction and the current output by the power conversion circuit, a modulation voltage signal to control the power conversion circuit. Herein, in an aspect, the power converter may limit the output current; and in another aspect, the power converter may generate a current instruction through the voltage loop based on the output voltage of the power conversion circuit. Fluctuation of the output voltage of the power conversion circuit causes a change of a ratio of an active current to a reactive current in the generated current instruction, and change information of the ratio of the active current to the reactive current is maintained while the circular limiter is used for current limiting, so that the power converter maintains a capability of responding to fluctuation of the amplitude of the voltage output by the power conversion circuit.

In a possible implementation, the method includes: adjusting an output virtual inductive reactance of the power conversion circuit, to enable a ratio of the virtual inductive reactance to a virtual inductive reactance reference value to be a difference between 1 and an overcurrent ratio, where the overcurrent ratio is equal to a ratio of the current instruction threshold to the amplitude of the first current instruction, and the output virtual inductive reactance is an imaginary part of the output virtual impedance; and adjusting an output virtual resistance of the power conversion circuit, to enable a ratio of the virtual resistance to the virtual inductive reactance to be equal to a preset ratio or a preset expression, where the output virtual resistance is a real part of the output virtual impedance, and the preset ratio is a negative ratio of the active current to the reactive current output by the power conversion circuit or a negative ratio of an active current instruction to a reactive current instruction in the second current instruction.

In a possible implementation, the method includes: in response to that the amplitude of the first current instruction is not greater than the current instruction threshold, controlling the output virtual impedance of the power conversion circuit to be zero.

According to a third aspect, the embodiments provide a power system. The power system includes a direct current power supply and at least one power converter, the power converter includes a controller and a power conversion circuit, an input of the power conversion circuit is connected to the direct current power supply, an output of the power conversion circuit is coupled to an alternating current grid through a grid connection point, and the power conversion circuit is configured to output an alternating current to the alternating current grid. The controller is configured to: when a voltage at the grid connection point is within a preset voltage range, control the power converter to work in a steady-state mode, where in the steady-state mode, an amplitude of a current output by the power conversion circuit is not greater than a first current threshold; or when the voltage at the grid connection point exceeds the preset voltage range: in response to that an amplitude of a voltage output by the power conversion circuit is not greater than a voltage threshold, control the power converter to work in a transient voltage stabilization mode, where in the transient voltage stabilization mode, the amplitude of the current output by the power conversion circuit is not greater than a second current threshold, the second current threshold is greater than the first current threshold, and a ratio of an active current to a reactive current output by the power conversion circuit is constant or changes; or in response to that the amplitude of the voltage output by the power conversion circuit is greater than the voltage threshold, control the power converter to work in a transient voltage regulation mode, where in the transient voltage regulation mode, the amplitude of the current output by the power conversion circuit is equal to the second current threshold, and the ratio of the active current to the reactive current output by the power conversion circuit changes. Herein, in a current limiting process, the power converter can still provide voltage support for the alternating current grid, and a grid-forming capability of the power converter can be maintained, enhancing reliability of grid power supply is high.

DETAILED DESCRIPTION OF EMBODIMENTS

Figure 1:
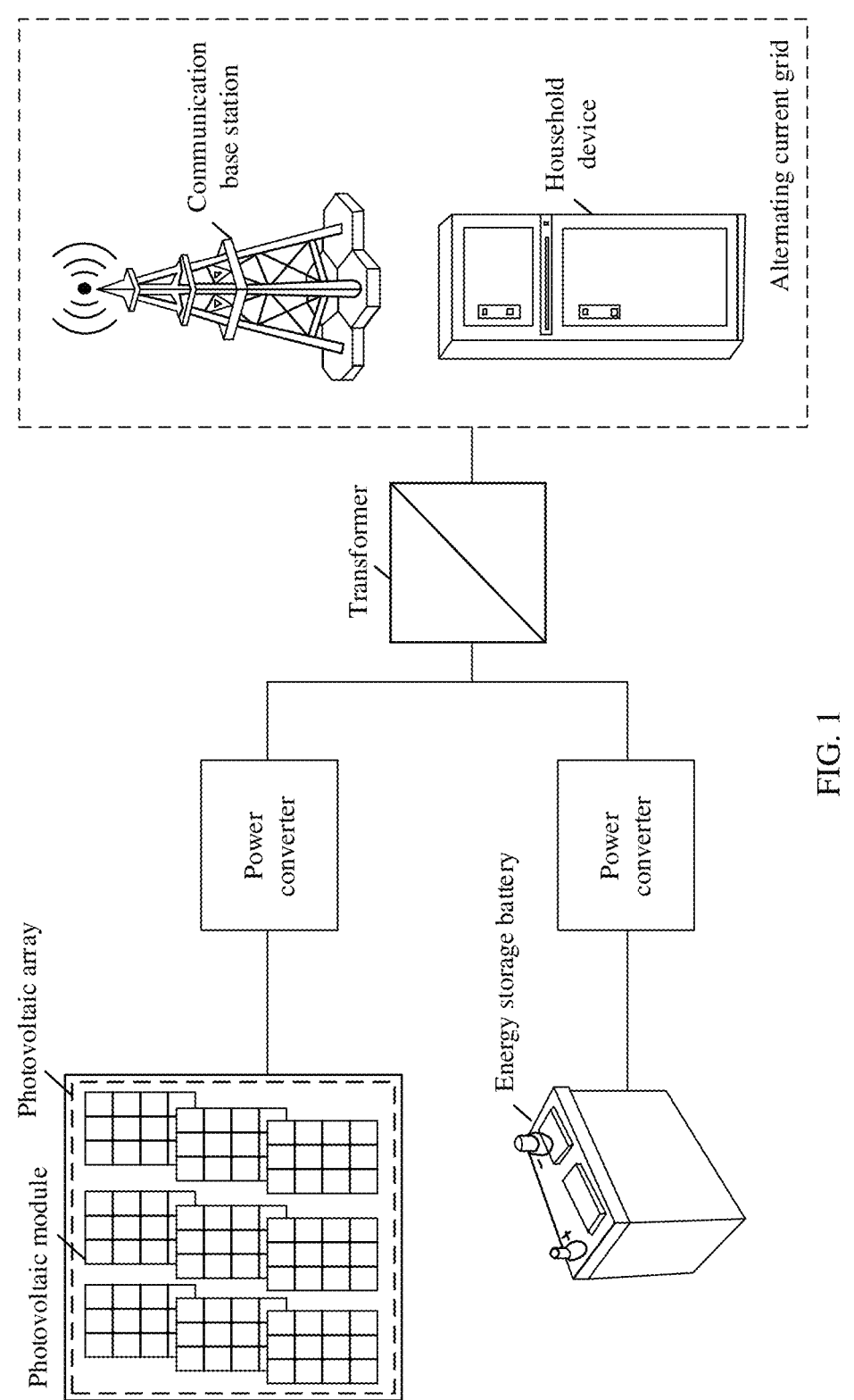
FIG. 1 is a diagram of an application scenario of a power system according to the embodiments.

FIG. 1 is a diagram of an application scenario of a power system according to the embodiments. The power system provided in the embodiments may include a direct current power supply and a power converter. The direct current power supply may include a photovoltaic array. An output of the photovoltaic array may be coupled and connected to an input of the power converter. An output of the power converter may be coupled to an alternating current grid through a grid connection point. In the power system shown in FIG. 1, the photovoltaic array may include one or more photovoltaic strings connected in parallel, and one photovoltaic string may be obtained by connecting one or more photovoltaic modules in series. The power converter may perform inversion conversion on a direct current output by the photovoltaic array, and output an alternating current obtained after the inversion conversion to the alternating current grid through the grid connection point, to supply power to a power-consuming device in the alternating current grid, for example, a communication base station or a household device.

Still refer to FIG. 1. In the power system provided in the embodiments, the direct current power supply may further include an energy storage battery. An output of the energy storage battery may be connected to the input of the power converter. The output of the power converter may be coupled to the alternating current grid through the grid connection point. The power converter may perform inversion conversion on a direct current provided by the energy storage battery, and output an alternating current obtained after the inversion conversion to the alternating current grid through the grid connection point, to supply power to the power-consuming device in the alternating current grid, for example, the communication base station or the household device. Alternatively, the power converter may provide a direct current to the energy storage battery after performing rectification conversion on an alternating current provided by the alternating current grid.

Still refer to FIG. 1. The power system may further include a transformer. The output of the power converter may be connected to one end of the transformer, and the other end of the transformer may be coupled to the alternating current grid through the grid connection point. The power converter performs inversion conversion on a direct current provided by the photovoltaic array or the energy storage battery, and outputs an alternating current obtained after the inversion conversion to the transformer. The transformer performs voltage conversion based on the alternating current output by the power converter, and outputs a boosted or bucked alternating current to the alternating current grid through the grid connection point, to supply power to the alternating current grid.

In the application scenario shown in FIG. 1, in a process in which the power system supplies power to the alternating current grid, because an output current of the power converter may increase rapidly due to factors such as a grid fault, an overcurrent phenomenon may easily occur. However, a semiconductor power device in the power converter has a poor overcurrent capability, and can withstand a very limited short-circuit current. If no control measure is taken after a protection current is exceeded, the power device in the power converter may be overheated or fail, or there is even a risk of explosion or burning of the power converter. In a current grid-forming power converter, current limiting can be performed by switching a control type. For example, when a fault is detected, the power converter switches to a grid following mode or directly disconnects from a grid. During the grid following mode, a grid-forming control characteristic disappears, and no device in the power system provides a grid-forming capability. Therefore, devices in the power system may lose synchronization, causing the grid to break down; and reliability of grid power supply is low.

In the power system provided in the embodiments, the power converter may include a controller and a power conversion circuit, and an output of the power conversion circuit is connected to the alternating current grid through the grid connection point. When a voltage at the grid connection point is within a preset voltage range, in other words, when the power system is in a steady state, the controller may control the power converter to work in a steady-state mode, where in the steady-state mode, an amplitude of a current output by the power conversion circuit is not greater than a first current threshold. Further, when the voltage at the grid connection point exceeds the preset voltage range, in other words, when the power system is in a transient state, the amplitude of the current output by the power conversion circuit is greater than the first current threshold. In response to that an amplitude of a voltage output by the power conversion circuit is not greater than a voltage threshold, the controller controls the power converter to work in a transient voltage stabilization mode; and in the transient voltage stabilization mode, controls the amplitude of the current output by the power conversion circuit to switch from being greater than the first current threshold to being not greater than a second current threshold. The second current threshold may be greater than the first current threshold (for example, may be 1.1 times the first current threshold), and a ratio of an active current to a reactive current output by the power conversion circuit is constant or changes. When active power and reactive power that are output by the power conversion circuit are used as control targets, the ratio of the active current to the reactive current output by the power conversion circuit is controlled to be constant. When the voltage output by the power conversion circuit is used as a control target, the ratio of the active current to the reactive current output by the power conversion circuit is controlled to change. When the voltage at the grid connection point exceeds the preset voltage range, in other words, when the power system is in the transient state, the amplitude of the current output by the power conversion circuit is greater than the first current threshold. In response to that the amplitude of the voltage output by the power conversion circuit is greater than the voltage threshold, the controller controls the power converter to work in a transient voltage regulation mode. In the transient voltage regulation mode, the controller controls the amplitude of the current output by the power conversion circuit to switch from being greater than the first current threshold to being equal to the second current threshold, and controls the ratio of the active current to the reactive current output by the power conversion circuit to change, so that a change amplitude of the amplitude of the voltage output by the power conversion circuit decreases, and therefore a change amplitude of a voltage of the grid decreases. In this way, in a current limiting process, voltage support can still be provided for the alternating current grid, and a grid-forming capability of the power converter can be maintained, enhancing reliability of grid power supply can be improved. In addition, the power converter can also meet a current limiting requirement without reserving a specific current margin, and an overcurrent capability of the power converter is more fully utilized.

Figure 2:
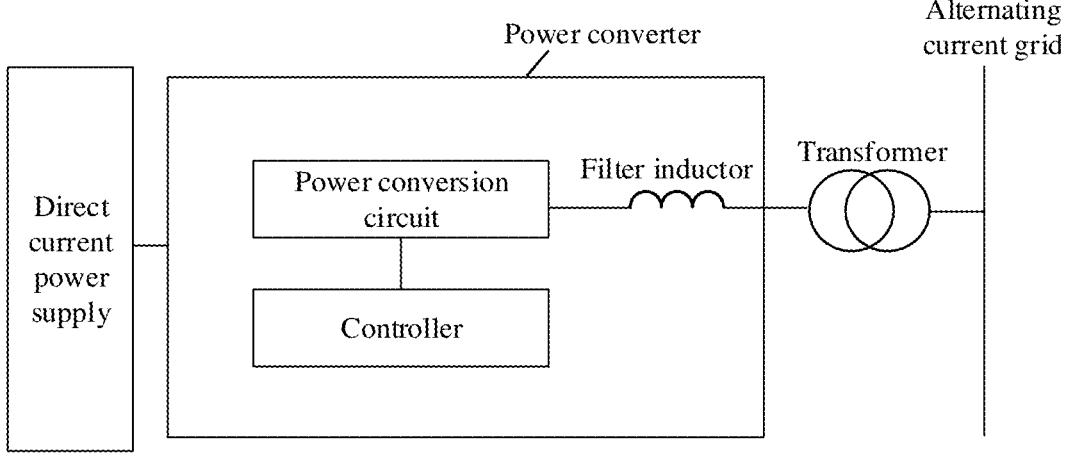
FIG. 2 is a diagram of a structure of a power system according to the embodiments.

FIG. 2 is a diagram of a structure of a power system according to the embodiments. The power system shown in FIG. 2 includes a power supply, a power converter, and a transformer. The power supply may be a photovoltaic array, an energy storage battery, or the like. An input of the power converter is connected to the power supply in the power system, and an output of the power converter is coupled to an alternating current grid through the transformer. In the power system shown in FIG. 2, the power converter performs, through a power conversion circuit, inversion conversion on a direct current output by the power supply, and outputs an alternating current (which may be a first alternating current) obtained after the inversion conversion to the transformer. The transformer performs voltage conversion based on the alternating current output by the power converter, and outputs a boosted or bucked alternating current (which may be a second alternating current) to the alternating current grid through a grid connection point, to supply power to a power-consuming device in the alternating current grid, for example, a communication base station or a household device.

In the power system shown in FIG. 2, the power converter may include a filter inductor, and the filter inductor is located between the power conversion circuit and the alternating current grid. In a working process of the power converter, a controller in the power converter may provide voltage support for the alternating current grid in response to voltage fluctuation of the alternating current grid when a voltage at the grid connection point exceeds a preset voltage range, in other words, when the power system is in a transient state. For example, in response to that an amplitude of a voltage output by the power conversion circuit is greater than a voltage threshold, the controller may control the power converter to work in a transient voltage regulation mode. In the transient voltage regulation mode, the controller controls an amplitude of a current output by the power conversion circuit to be equal to a second current threshold, and adjusts an output virtual impedance (which may be a virtual impedance between the power conversion circuit and the filter inductor) of the power conversion circuit to adjust a ratio of an active current to a reactive current output by the power conversion circuit to change, so that a change amplitude of the amplitude of the voltage output by the power conversion circuit decreases, and therefore a change amplitude of a voltage of the grid decreases. In this way, in a current limiting process, voltage support can still be provided for the alternating current grid, and a grid-forming capability of the power converter can be maintained.

Figure 3:
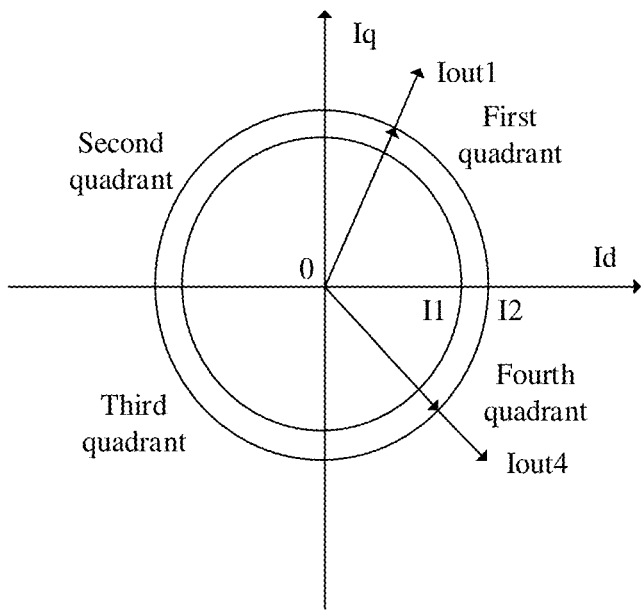
FIG. 3 is a diagram of control of an active current and a reactive current according to the embodiments.

For example, when the power system shown in FIG. 2 does not include the energy storage battery, in other words, only the photovoltaic array is used as a direct current power supply, the active current in the output current of the power conversion circuit is positive. FIG. 3 is a diagram of control of the active current and the reactive current according to the embodiments. When the voltage at the grid connection point exceeds the preset voltage range, in other words, when the power system is in the transient state, in response to that the amplitude of the voltage output by the power conversion circuit is greater than the voltage threshold, the controller may control the amplitude of the current output by the power conversion circuit to be equal to the second current amplitude, for example, may control values of the active current $Id$ and the reactive current $Iq$ that are output by the power conversion circuit, to enable a sum of squares of the active current $Id$ and the reactive current $Iq$ to remain unchanged. An example in which the values of the active current $Id$ and the reactive current $Iq$ are controlled to remain on a fixed circular line in FIG. 3 may be used. When only the photovoltaic array is used as the direct current power supply in the power system, a value of the active current $Id$ in the output current of the power conversion circuit is positive, in other words, the active current $Id$ and the reactive current $Iq$ may be controlled in a first quadrant and a fourth quadrant. In the first quadrant, in response to that an amplitude $Iout1$ of a voltage output by the power conversion circuit is greater than a first voltage threshold $I1$, the controller may control an amplitude $Iout1$ of a current output by the power conversion circuit to be equal to the second current amplitude $I2$, where the second current threshold $I2$ is greater than a first current threshold $I1$. In response to that an absolute value of a difference between the amplitude of the voltage output by the power conversion circuit and the voltage threshold increases, the controller may increase the output virtual impedance to increase the reactive current $Iq$ (which may be a capacitive reactive current, and a q-axis current of the output current) output by the power conversion circuit. For example, in FIG. 3, the amplitude $Iout1$ of the voltage output by the power conversion circuit moves counterclockwise in the first quadrant along a circle whose radius is $I2$. During movement, the reactive current $Iq$ increases and the active current $Id$ decreases, so that the ratio of the active current $Id$ to the reactive current $Iq$ decreases, output reactive power of the power conversion circuit decreases, the change amplitude of the amplitude of the output voltage decreases, and the amplitude of the output current is maintained as the second current threshold. In response to that an absolute value of a difference between the amplitude of the voltage output by the power conversion circuit and the voltage threshold decreases, the controller may reduce the output virtual impedance to decrease the reactive current $Iq$. For example, in FIG. 3, the amplitude $Iout1$ of the voltage output by the power conversion circuit moves clockwise in the first quadrant along the circle whose radius is $I2$. During movement, the reactive current $Iq$ decreases and the active current $Id$ increases, so that the ratio of the active current $Id$ to the reactive current $Iq$ increases, the output reactive power of the power conversion circuit increases, the change amplitude of the amplitude of the output voltage decreases, and the amplitude of the output current is maintained as the second current threshold. Similarly, in the fourth quadrant, in response to that an amplitude $Iout4$ of a voltage output by the power conversion circuit is greater than the first voltage threshold $I1$, the controller may control an amplitude $Iout4$ of a current output by the power conversion circuit to be equal to the second current amplitude $I2$, where the second current threshold $I2$ is greater than the first current threshold $I1$. In response to that the absolute value of the difference between the amplitude of the voltage output by the power conversion circuit and the voltage threshold increases, the controller may increase the output virtual impedance to increase the reactive current $Iq$. For example, in FIG. 3, the amplitude $Iout4$ of the voltage output by the power conversion circuit moves counterclockwise in the fourth quadrant along the circle whose radius is $I2$. During movement, the reactive current $Iq$ increases and the active current $Id$ increases, so that the ratio of the active current $Id$ to the reactive current $Iq$ decreases, the output reactive power of the power conversion circuit decreases, the change amplitude of the amplitude of the output voltage decreases, and the amplitude of the output current is maintained as the second current threshold. In response to that an absolute value of a difference between the amplitude of the voltage output by the power conversion circuit and the voltage threshold decreases, the controller may reduce the output virtual impedance to decrease the reactive current $Iq$. For example, in FIG. 3, the amplitude $Iout4$ of the voltage output by the power conversion circuit moves clockwise in the fourth quadrant along the circle whose radius is $I2$. During movement, the reactive current $Iq$ decreases and the active current Id decreases, so that the ratio of the active current Id to the reactive current Iq increases, the output reactive power of the power conversion circuit increases, the change amplitude of the amplitude of the output voltage decreases, and the amplitude of the output current is maintained as the second current threshold.

Figure 4:
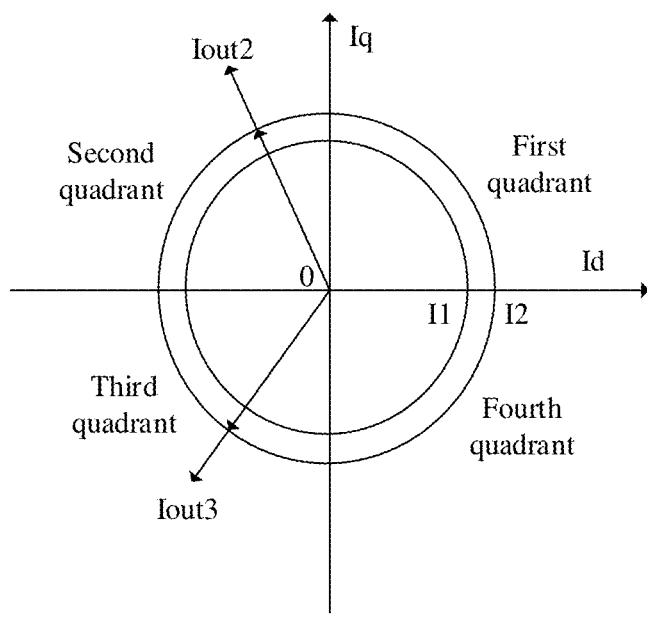
FIG. 4 is another diagram of control of an active current and a reactive current according to the embodiments.

When the power system shown in FIG. 2 includes the energy storage battery, in other words, the photovoltaic array and the energy storage battery are jointly used as a direct current power supply, the active current in the output current of the power conversion circuit is negative. FIG. 4 is another diagram of control of the active current and the reactive current according to the embodiments. When the photovoltaic array and the energy storage battery are jointly used as the direct current power supply in the power system, the active current Id in the output current of the power conversion circuit is negative, in other words, the active current Id and the reactive current Iq may be controlled in a second quadrant and a third quadrant. In the second quadrant, in response to that an amplitude Iout2 of a voltage output by the power conversion circuit is greater than a first voltage threshold I1, the controller may control an amplitude Iout2 of a current output by the power conversion circuit to be equal to the second current amplitude I2, where the second current threshold I2 is greater than a first current threshold I1. In response to that an absolute value of a difference between the amplitude of the voltage output by the power conversion circuit and the voltage threshold increases, the controller may increase the output virtual impedance to increase the reactive current Iq. For example, in FIG. 4, the amplitude Iout2 of the voltage output by the power conversion circuit moves clockwise in the second quadrant along a circle whose radius is I2. During movement, the reactive current Iq increases and the active current Id increases, so that the ratio of the active current Id to the reactive current Iq increases, output reactive power of the power conversion circuit decreases, the change amplitude of the amplitude of the output voltage decreases, and the amplitude of the output current is maintained as the second current threshold. In response to that an absolute value of a difference between the amplitude of the voltage output by the power conversion circuit and the voltage threshold decreases, the controller may reduce the output virtual impedance to decrease the reactive current Iq. For example, in FIG. 4, the amplitude Iout2 of the voltage output by the power conversion circuit moves counterclockwise in the second quadrant along the circle whose radius is I2. During movement, the reactive current Iq decreases and the active current Id decreases, so that the ratio of the active current Id to the reactive current Iq decreases, the output reactive power of the power conversion circuit increases, the change amplitude of the amplitude of the output voltage decreases, and the amplitude of the output current is maintained as the second current threshold. Similarly, in the third quadrant, in response to that an amplitude Iout3 of a voltage output by the power conversion circuit is greater than the first voltage threshold I1, the controller may control an amplitude Iout3 of a current output by the power conversion circuit to be equal to the second current amplitude I2, where the second current threshold I2 is greater than the first current threshold I1. In response to that the absolute value of the difference between the amplitude of the voltage output by the power conversion circuit and the voltage threshold increases, the controller may increase the output virtual impedance to increase the reactive current Iq. For example, in FIG. 4, the amplitude Iout3 of the voltage output by the power conversion circuit moves clockwise in the third quadrant along the circle whose radius is I2. During movement, the reactive current Iq increases and the active current Id decreases, so that the ratio of the active current Id to the reactive current Iq increases, the output reactive power of the power conversion circuit decreases, the change amplitude of the amplitude of the output voltage decreases, and the amplitude of the output current is maintained as the second current threshold. In response to that an absolute value of a difference between the amplitude of the voltage output by the power conversion circuit and the voltage threshold decreases, the controller may reduce the output virtual impedance to decrease the reactive current Iq. For example, in FIG. 4, the amplitude Iout3 of the voltage output by the power conversion circuit moves counterclockwise in the third quadrant along the circle whose radius is I2. During movement, the reactive current Iq decreases and the active current Id increases, so that the ratio of the active current Id to the reactive current Iq decreases, the output reactive power of the power conversion circuit increases, the change amplitude of the amplitude of the output voltage decreases, and the amplitude of the output current is maintained as the second current threshold. In the current limiting process, the power converter can still provide voltage support for the alternating current grid, and the grid-forming capability of the power converter can be maintained, enhancing reliability of grid power supply. In addition, the power converter can also meet a current limiting requirement without reserving a specific current margin, and an overcurrent capability of the power converter is more fully utilized.

Figure 5:
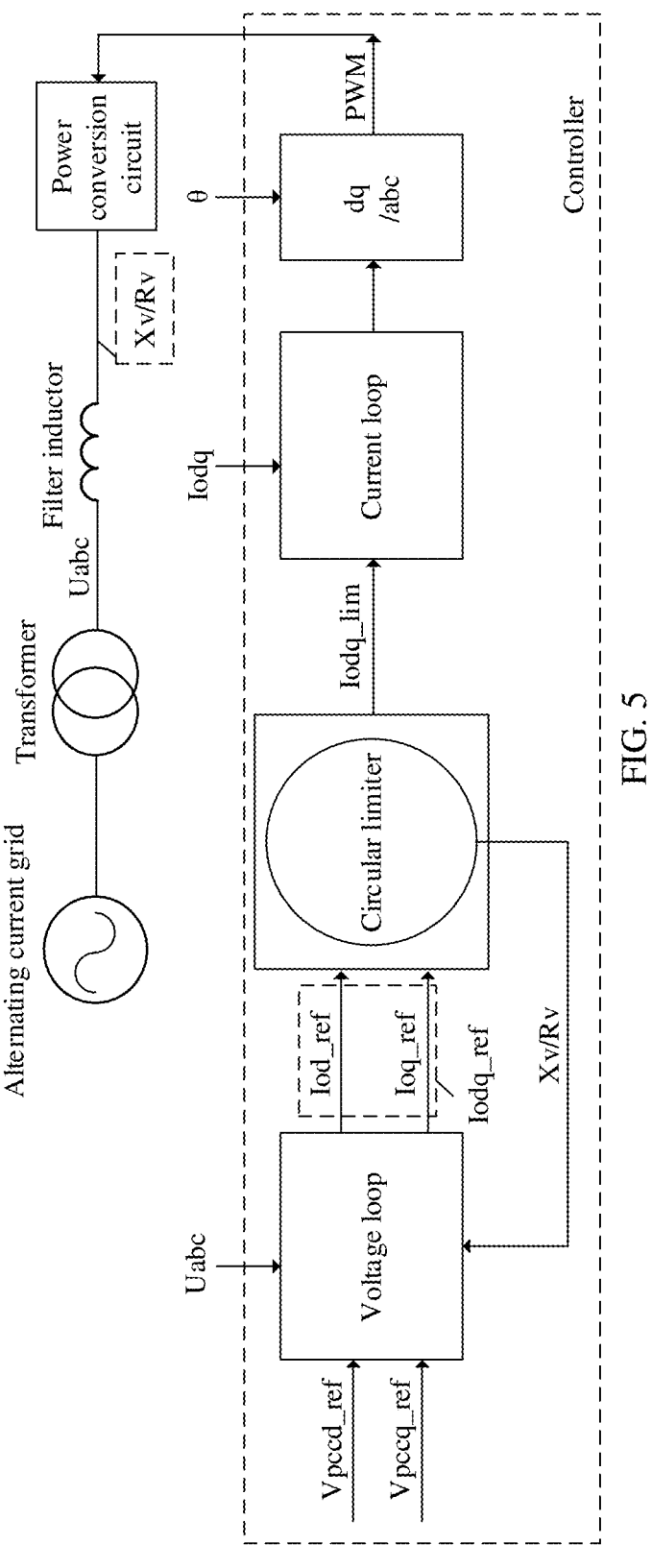
FIG. 5 is a diagram of control of a power conversion circuit of a power converter according to the embodiments.

The following describes the power converter provided in embodiments by using an example with reference to FIG. 1 to FIG. 6. FIG. 5 is a diagram of control of a power conversion circuit of a power converter according to the embodiments. As shown in FIG. 5, the power converter may include the power conversion circuit, a controller, and a filter inductor. The power conversion circuit is connected to one end of a transformer through the filter inductor. The controller may generate a first current instruction (which may be represented as Iodq_ref for ease of description) through a voltage loop based on an output voltage (which may be represented as Uabc for ease of description) of the power conversion circuit and a voltage instruction (which may be represented as Vpcc_ref for ease of description). Iodq_ref may include a d-axis current (or an active current, which may be represented as Iod_ref) and a q-axis current (or a reactive current, which may be represented as Ioq_ref). In response to that an amplitude of the first current instruction generated by the voltage loop is greater than a first current threshold, the controller may adjust the amplitude of the first current instruction through a circular limiter, to obtain a second current instruction whose amplitude is a second current threshold. Herein, the amplitude of the first current instruction generated by the voltage loop may be obtained based on an amplitude (which may be represented as $\|Iod\_ref\|$) of the d-axis current and an amplitude (which may be represented as $\|Ioq\_ref\|$) of the q-axis current, that is, $\sqrt{\|Iod\_ref\|^2 + \|Ioq\_ref\|^2}$. The second current instruction obtained by the controller through the circular limiter may be represented as Iodq_lim. A ratio of a d-axis current to a q-axis current in the current instruction is the same as a ratio of the d-axis current Iod_ref to the q-axis current Ioq_ref. Herein, the circular limiter changes only the amplitude of the input first current instruction, and the ratio of the d-axis current (or the active current) to the q-axis current (or the reactive current) of the input first current instruction remains unchanged. In an aspect, the power converter may limit an output current; and in another aspect, the power converter may generate a current instruction through the voltage loop based on the output voltage of the power conversion circuit. Fluctuation of the output voltage of the power conversion circuit causes a change of a ratio of a d-axis current to a q-axis current in the generated current instruction, and change information of the ratio of the d-axis current to the q-axis current is maintained while the circular limiter is used for current limiting, so that the power converter maintains a capability of responding to fluctuation of an amplitude of the voltage output by the power conversion circuit. The second current instruction Iodq_lim may be represented as:

$$\text{Iodq\_lim} = K_{lim} \cdot \text{Iodq\_ref}.$$

Iodq_ref is the first current instruction generated by the voltage loop, and $K_{lim}$ is an overcurrent ratio and may be represented as:

$$K_{lim} = \begin{cases} 1, & \|\text{Iodq\_ref}\| < I_{lim} \\ \dfrac{I_{lim}}{\|\text{Iodq\_ref}\|}, & \|\text{Iodq\_ref}\| \ge I_{lim} \end{cases}.$$

$\|\text{Iodq\_ref}\|$ is the amplitude of the first current instruction generated by the voltage loop, and $I_{lim}$ is a current instruction threshold. The controller may generate a modulation voltage instruction through a current loop based on the second current instruction Iodq_lim output by the circular limiter and the output current Iodq of the power conversion circuit, and perform dq/abc conversion based on the modulation voltage instruction output by the current loop and an equivalent voltage source angle θ, to obtain a pulse width modulation (PWM) signal. The PWM signal acts as a drive signal on the power conversion circuit in the power converter.

In some implementations, an output virtual impedance of the power converter may be a virtual impedance between the power conversion circuit and the filter inductor of the power converter. For example, the virtual impedance may include a virtual inductive reactance $X_v$ and a virtual resistance $R_v$. The controller may adjust the virtual inductive reactance between the power conversion circuit and the filter inductor, to enable a ratio of the virtual inductive reactance to a virtual inductive reactance reference value to be a difference between 1 and the overcurrent ratio, that is, the virtual inductive reactance $X_v$ may be represented as:

$$X_v = (1 - K_{lim}) \cdot X_o.$$

$X_o$ is the virtual inductive reactance reference value, and $K_{lim}$ is the overcurrent ratio. The controller may adjust the virtual resistance between the power conversion circuit and the filter inductor, to enable a ratio of the virtual resistance to the virtual inductive reactance to be equal to a negative ratio of the output active current to the output reactive current of the power conversion circuit, that is, the virtual resistance $R_v$ may be represented as:

$$R_v = \left(-\frac{Iod}{Ioq}\right) \cdot X_v.$$

Iod and Ioq are respectively the active current and the reactive current that are output by the power conversion circuit. It may be understood that the ratio of the virtual resistance to the virtual inductive reactance may alternatively be a negative ratio of an active current instruction to a reactive current instruction (or a negative ratio of the d-axis current to the q-axis current) in the second current instruction Iodq_lim, or the ratio of the virtual resistance to the virtual inductive reactance may be another preset expression and may be determined based on an actual application scenario requirement. This is not limited herein. Further, in response to that the amplitude of the first current instruction output by the voltage loop is greater than the current threshold: when the amplitude of the first current instruction decreases, the controller may control the output virtual impedance of the power converter to decrease; or when the amplitude of the first current instruction increases, the controller may control the output virtual impedance of the power converter to increase. Alternatively, in response to that an amplitude of a current instruction value is not greater than the current threshold, the controller adjusts the output virtual impedance to be zero.

In some implementations, the controller may update the voltage instruction Vpcc_ref based on an adjusted virtual impedance (including a virtual inductive reactance $X_v$ and a virtual resistance $R_v$). The voltage instruction Vpcc_ref may include a d-axis voltage (or an active voltage, which may be represented as Vpccd_ref) and a q-axis voltage (or a reactive voltage, which may be represented as Vpccq_ref). An updated voltage instruction may include a d-axis voltage (which may be represented as Vpccd_ref_new) and a q-axis voltage (which may be represented as Vpccq_ref_new), and Vpccd_ref_new and Vpccq_ref_new may be respectively represented as:

$$\text{Vpccd\_ref\_new} = \text{Vpccd\_ref} - Iod \cdot R_v + Ioq \cdot X_v; \text{ and}$$

$$\text{Vpccq\_ref\_new} = \text{Vpccq\_ref} - Ioq \cdot R_v - Iod \cdot X_v.$$

Herein, the controller updates, based on the adjusted virtual impedance, the voltage instruction input into the voltage loop, so that the voltage loop generates a new current instruction based on the output voltage of the power conversion circuit and the updated voltage instruction. The circular limiter performs amplitude adjustment on the first current instruction output by the voltage loop. Then, the modulation voltage instruction is generated through the current loop based on the second current instruction output by the circular limiter and the output current of the power conversion circuit. Then, dq/abc conversion is performed based on the modulation voltage instruction output by the current loop and the equivalent voltage source angle θ, to obtain the PWM signal and send the PWM signal to the power conversion circuit in the power converter. In this way, when the amplitude of the voltage output by the power conversion circuit decreases, an amplitude of the updated voltage instruction increases; or when the amplitude of the voltage output by the power conversion circuit increases, the amplitude of the updated voltage instruction decreases, so that a change amplitude of the amplitude of the voltage output by the power conversion circuit decreases. In a current limiting process, the power converter can still provide voltage support for an alternating current grid, and a grid-forming capability of the power converter can be maintained, enhancing reliability of grid power supply is high.

In the embodiments, when the voltage at the grid connection point is within the preset voltage range, in other words, when the power system is in the steady state, the controller in the power converter may control the power converter to work in the steady-state mode, where in the steady-state mode, the amplitude of the current output by the power conversion circuit is not greater than the first current threshold. Further, when the voltage at the grid connection point exceeds the preset voltage range, in other words, when the power system is in the transient state, the controller may support voltage fluctuation of the alternating current grid. In a voltage fluctuation process of the grid connection point, fluctuation of the amplitude of the voltage output by the power conversion circuit may be caused. In response to that the amplitude of the voltage output by the power conversion circuit is greater than the voltage threshold, the controller controls the power converter to work in the transient voltage regulation mode. In the transient voltage regulation mode, the controller controls the amplitude of the current output by the power conversion circuit to be equal to the second current threshold, and controls the ratio of the active current to the reactive current output by the power conversion circuit to change, so that the change amplitude of the amplitude of the voltage output by the power conversion circuit decreases, and therefore the change amplitude of the voltage of the grid decreases. In this way, in the current limiting process, voltage support can still be provided for the alternating current grid, and the grid-forming capability of the power converter can be maintained, so that the reliability of grid power supply can be improved. In addition, the power converter can also meet the current limiting requirement without reserving the specific current margin, and the overcurrent capability of the power converter is more fully utilized.

Figure 6:
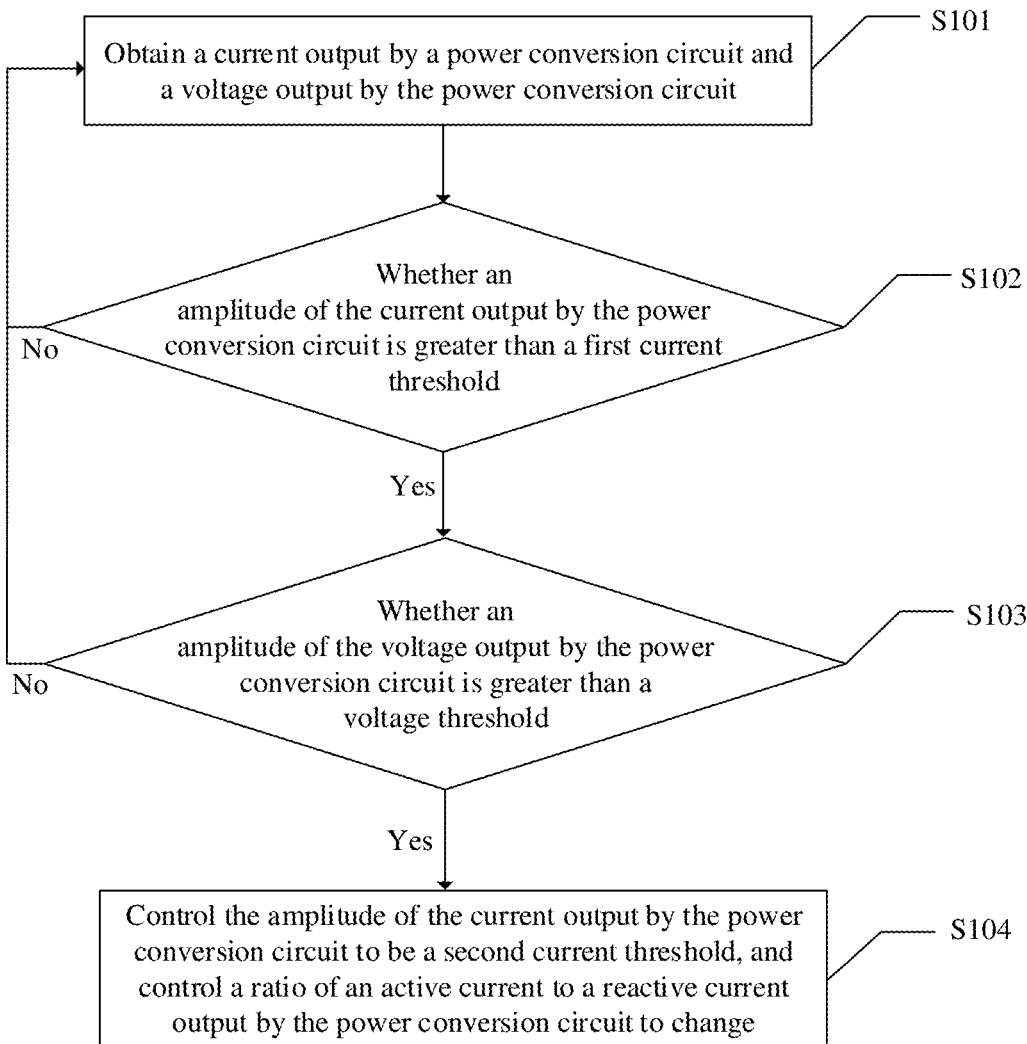
FIG. 6 is a schematic flowchart of a method for controlling a power converter according to the embodiments.

FIG. 6 is a schematic flowchart of a method for controlling a power converter according to the embodiments. The method for controlling a power converter provided in the embodiments is applicable to the power converter shown in FIG. 1 to FIG. 5. An output of a power conversion circuit is coupled to an alternating current grid through a grid connection point. The power conversion circuit is configured to output an alternating current to the alternating current grid. As shown in FIG. 6, the method for controlling a power converter provided in the embodiments includes the following steps:

S101: Obtain a current output by the power conversion circuit and a voltage output by the power conversion circuit.

S102: Determine whether an amplitude of the current output by the power conversion circuit is greater than a first current threshold. If a determining result is yes, perform step S103. If a determining result is no, perform step S101.

S103: Determine whether an amplitude of the voltage output by the power conversion circuit is greater than a voltage threshold. If a determining result is yes, perform step S104. If a determining result is no, perform step S101.

S104: Control the amplitude of the current output by the power conversion circuit to be a second current threshold, and control a ratio of an active current to a reactive current output by the power conversion circuit to change.

In a working process of the power converter, in response to that the amplitude of the current output by the power conversion circuit is greater than the first current threshold, the power converter may control the amplitude of the current output by the power conversion circuit to be the second current threshold. In addition, during a transient state (in other words, during an overcurrent period of an output current of the power converter that is caused by a grid fault or the like), in response to fluctuation of the amplitude of the voltage output by the power conversion circuit, in other words, that a difference between the amplitude of the output voltage of the power conversion circuit and a rated voltage is greater than a set voltage difference, the power converter may adjust an output virtual impedance (which may be a virtual impedance between the power conversion circuit and a filter inductor) of the power conversion circuit based on the output voltage of the power conversion circuit. When a voltage at the grid connection point exceeds a preset voltage range, in other words, when a power system is in a transient state, the amplitude of the current output by the power conversion circuit is greater than the first current threshold. Further, in response to that the amplitude of the voltage output by the power conversion circuit is greater than the voltage threshold, the controller controls the power converter to work in a transient voltage regulation mode. In the transient voltage regulation mode, the controller controls the amplitude of the current output by the power conversion circuit to switch from being greater than the first current threshold to being equal to the second current threshold, and controls the ratio of the active current to the reactive current output by the power conversion circuit to change, so that a change amplitude of the amplitude of the voltage output by the power conversion circuit decreases, and therefore a change amplitude of a voltage of the grid decreases. In this way, in a current limiting process, voltage support can still be provided for the alternating current grid, and a grid-forming capability of the power converter can be maintained, enhancing reliability of grid power supply can be improved. In addition, the power converter can also meet a current limiting requirement without reserving a specific current margin, and an overcurrent capability of the power converter is more fully utilized.

For example, when a direct current power supply connected to the power converter does not include an energy storage battery, in other words, only a photovoltaic array is used as the direct current power supply, the active current in the output current of the power conversion circuit is positive. When the reactive current is positive, in response to that an absolute value of a difference between the amplitude of the voltage output by the power conversion circuit and the voltage threshold increases, the controller may increase the output virtual impedance to increase the reactive current (which may be a capacitive reactive current, and a q-axis current of the output current). In addition, the active current decreases, so that the ratio of the active current to the reactive current decreases, output reactive power of the power conversion circuit decreases, the change amplitude of the amplitude of the output voltage decreases, and the amplitude of the output current is maintained as the second current threshold. In response to that an absolute value of a difference between the amplitude of the voltage output by the power conversion circuit and the voltage threshold decreases, the controller may reduce the output virtual impedance to decrease the reactive current. In addition, the active current increases, so that the ratio of the active current to the reactive current increases, the output reactive power of the power conversion circuit increases, the change amplitude of the amplitude of the output voltage decreases, and the amplitude of the output current is maintained as the second current threshold. When the reactive current is negative, in response to that an absolute value of a difference between the amplitude of the voltage output by the power conversion circuit and the voltage threshold increases, the controller may increase the output virtual impedance to increase the reactive current. In addition, the active current increases, so that the ratio of the active current to the reactive current decreases, the output reactive power of the power conversion circuit decreases, the change amplitude of the amplitude of the output voltage decreases, and the amplitude of the output current is maintained as the second current threshold. In response to that an absolute value of a difference between the amplitude of the voltage output by the power conversion circuit and the voltage threshold decreases, the controller may reduce the output virtual impedance to decrease the reactive current. In addition, the active current decreases, so that the ratio of the active current to the reactive current increases, the output reactive power of the power conversion circuit increases, the change amplitude of the amplitude of the output voltage decreases, and the amplitude of the output current is maintained as the second current threshold.

Further, when the direct current power supply connected to the power converter includes the energy storage battery, in other words, the photovoltaic array and the energy storage battery are jointly used as the direct current power supply, the active current in the output current of the power conversion circuit is negative. When the reactive current is positive, in response to that an absolute value of a difference between the amplitude of the voltage output by the power conversion circuit and the voltage threshold increases, the controller may increase the output virtual impedance to increase the reactive current. In addition, the active current increases, so that the ratio of the active current to the reactive current increases, the output reactive power of the power conversion circuit decreases, the change amplitude of the amplitude of the output voltage decreases, and the amplitude of the output current is maintained as the second current threshold. In response to that an absolute value of a difference between the amplitude of the voltage output by the power conversion circuit and the voltage threshold decreases, the controller may reduce the output virtual impedance to decrease the reactive current. In addition, the active current decreases, so that the ratio of the active current to the reactive current decreases, the output reactive power of the power conversion circuit increases, the change amplitude of the amplitude of the output voltage decreases, and the amplitude of the output current is maintained as the second current threshold. When the reactive current is negative, in response to that an absolute value of a difference between the amplitude of the voltage output by the power conversion circuit and the voltage threshold increases, the controller may increase the output virtual impedance to increase the reactive current. In addition, the active current decreases, so that the ratio of the active current to the reactive current increases, the output reactive power of the power conversion circuit decreases, the change amplitude of the amplitude of the output voltage decreases, and the amplitude of the output current is maintained as the second current threshold. In response to that an absolute value of a difference between the amplitude of the voltage output by the power conversion circuit and the voltage threshold decreases, the controller may reduce the output virtual impedance to decrease the reactive current. In addition, the active current increases, so that the ratio of the active current to the reactive current decreases, the output reactive power of the power conversion circuit increases, the change amplitude of the amplitude of the output voltage decreases, and the amplitude of the output current is maintained as the second current threshold.

In some implementations, in response to that the amplitude of the output current of the power conversion circuit is greater than the first current threshold, and a difference between the amplitude of the output current and the current threshold is greater than a preset current difference, the power converter may control the amplitude of the current output by the power conversion circuit to be the second current threshold. Herein, when detecting that the difference between the amplitude of the output current of the power conversion circuit and the first current threshold is greater than the preset current difference, the power converter controls the amplitude of the current output by the power conversion circuit to be the second current threshold, to avoid frequent control of a switching transistor in the power conversion circuit that is caused by continuous fluctuation of the output current of the power conversion circuit (for example, the amplitude of the output current of the power conversion circuit is greater than the first current threshold, and then is less than the first current threshold in an extremely short time interval), and improve working reliability of the power converter.

In some implementations, in response to that the amplitude of the output current remains greater than the first current threshold within a preset time interval, the power converter may control the amplitude of the current output by the power conversion circuit to be the second current threshold. Herein, when detecting that the amplitude of the output current of the power conversion circuit remains greater than the first current threshold in the preset time interval, the power converter controls the amplitude of the current output by the power conversion circuit to be the second current threshold, to avoid frequent control of a switching transistor in the power conversion circuit that is caused by continuous fluctuation of the output current of the power conversion circuit (for example, the amplitude of the output current of the power conversion circuit is greater than the first current threshold, and then is less than the first current threshold in an extremely short time interval), and improve working reliability of the power converter.

What is claimed is:

1. A power converter comprising:

a power conversion circuit, wherein an input of the power conversion circuit is configured to connect to a direct current power supply, an output of the power conversion circuit is coupled to an alternating current grid through a grid connection point, and the power conversion circuit is configured to output an alternating current to the alternating current grid; and a controller that is configured to:

when a voltage at the grid connection point is within a preset voltage range, control the power converter to work in a steady-state mode, wherein in the steady-state mode, an amplitude of a current output by the power conversion circuit is not greater than a first current threshold; and when the voltage at the grid connection point exceeds the preset voltage range:

after an amplitude of a voltage output by the power conversion circuit is not greater than a voltage threshold, control the power converter to work in a transient voltage stabilization mode, wherein in the transient voltage stabilization mode, the amplitude of the current output by the power conversion circuit is not greater than a second current threshold, the second current threshold is greater than the first current threshold, and a ratio of an active current to a reactive current output by the power conversion circuit is constant or changes; and after the amplitude of the voltage output by the power conversion circuit is greater than the voltage threshold, control the power converter to work in a transient voltage regulation mode, wherein, in the transient voltage regulation mode, the amplitude of the current output by the power conversion circuit is identically equal to the second current threshold, and the ratio of the active current to the reactive current output by the power conversion circuit changes.

2. The power converter according to claim 1, wherein the controller is further configured to:

after the amplitude of the voltage output by the power conversion circuit is greater than the voltage threshold, control the power converter to work in the transient voltage regulation mode; and, in the transient voltage regulation mode:

after an absolute value of a difference between the amplitude of the voltage output by the power conversion circuit and the voltage threshold increases, control the ratio of the active current to the reactive current to decrease; and after the absolute value of the difference between the amplitude of the voltage output by the power conversion circuit and the voltage threshold decreases, control the ratio of the active current to the reactive current to increase.

3. The power converter according to claim 1, wherein the direct current power supply comprises an energy storage battery, and the controller is further configured to:

after the power converter outputs an alternating current to the alternating current grid based on a direct current output by the energy storage battery, and the amplitude of the voltage output by the power conversion circuit is greater than the voltage threshold, control the power converter to work in the transient voltage regulation mode; and, in the transient voltage regulation mode:

after an absolute value of a difference between the amplitude of the voltage output by the power conversion circuit and the voltage threshold increases, control the ratio of the active current to the reactive current to decrease; and after the absolute value of the difference between the amplitude of the voltage output by the power conversion circuit and the voltage threshold decreases, control the ratio of the active current to the reactive current to increase.

4. The power converter according to claim 1, wherein the direct current power supply comprises an energy storage battery, and the controller is further configured to:

after the power converter outputs a direct current to the energy storage battery based on an alternating current output by the alternating current grid, and the amplitude of the voltage output by the power conversion circuit is greater than the voltage threshold, control the power converter to work in the transient voltage regulation mode; and, in the transient voltage regulation mode:

after an absolute value of a difference between the amplitude of the voltage output by the power conversion circuit and the voltage threshold increases, control the ratio of the active current to the reactive current to increase; and after the absolute value of the difference between the amplitude of the voltage output by the power conversion circuit and the voltage threshold decreases, control the ratio of the active current to the reactive current to decrease.

5. The power converter according to claim 2, wherein the controller is further configured to:

generate a first current instruction through a voltage loop based on the voltage output by the power conversion circuit and an initial voltage instruction;

after an amplitude of the first current instruction is greater than a current instruction threshold and the amplitude of the first current instruction decreases, control an output virtual impedance of the power conversion circuit to decrease;

after the amplitude of the first current instruction is greater than the current instruction threshold and the amplitude of the first current instruction increases, control an output virtual impedance of the power conversion circuit to increase, to update the initial voltage instruction based on a decreased or increased virtual impedance;

generate, through a circular limiter based on the first current instruction, a second current instruction whose amplitude is the current instruction threshold, and input the second current instruction into a current loop, wherein a ratio of an active current to a reactive current in the first current instruction is the same as a ratio of an active current to a reactive current in the second current instruction; and generate, through the current loop based on the second current instruction and the current output by the power conversion circuit, a modulation voltage signal to control the power conversion circuit.

6. The power converter according to claim 3, wherein the controller is further configured to:

generate a first current instruction through a voltage loop based on the voltage output by the power conversion circuit and an initial voltage instruction;

after an amplitude of the first current instruction is greater than a current instruction threshold and the amplitude of the first current instruction decreases, control an output virtual impedance of the power conversion circuit to decrease;

after the amplitude of the first current instruction is greater than the current instruction threshold and the amplitude of the first current instruction increases, control an output virtual impedance of the power conversion circuit to increase, to update the initial voltage instruction based on a decreased or increased virtual impedance;

generate, through a circular limiter based on the first current instruction, a second current instruction whose amplitude is the current instruction threshold, and input the second current instruction into a current loop, wherein a ratio of an active current to a reactive current in the first current instruction is the same as a ratio of an active current to a reactive current in the second current instruction; and generate, through the current loop based on the second current instruction and the current output by the power conversion circuit, a modulation voltage signal to control the power conversion circuit.

7. The power converter according to claim 4, wherein the controller is further configured to:

generate a first current instruction through a voltage loop based on the voltage output by the power conversion circuit and an initial voltage instruction;

after an amplitude of the first current instruction is greater than a current instruction threshold and the amplitude of the first current instruction decreases, control an output virtual impedance of the power conversion circuit to decrease;

after the amplitude of the first current instruction is greater than the current instruction threshold and the amplitude of the first current instruction increases, control an output virtual impedance of the power conversion circuit to increase, to update the initial voltage instruction based on a decreased or increased virtual impedance;

generate, through a circular limiter based on the first current instruction, a second current instruction whose amplitude is the current instruction threshold, and input the second current instruction into a current loop, wherein a ratio of an active current to a reactive current in the first current instruction is the same as a ratio of an active current to a reactive current in the second current instruction; and generate, through the current loop based on the second current instruction and the current output by the power conversion circuit, a modulation voltage signal to control the power conversion circuit.

8. The power converter according to claim 5, wherein the controller is further configured to:

adjust an output virtual inductive reactance of the power conversion circuit, to enable a ratio of the virtual inductive reactance to a virtual inductive reactance reference value to be a difference between 1 and an overcurrent ratio, wherein the overcurrent ratio is equal to a ratio of the current instruction threshold to the amplitude of the first current instruction, and the output virtual inductive reactance is an imaginary part of the output virtual impedance; and adjust an output virtual resistance of the power conversion circuit, to enable a ratio of the virtual resistance to the virtual inductive reactance to be equal to a preset ratio or a preset expression, wherein the output virtual resistance is a real part of the output virtual impedance.

9. The power converter according to claim 8, wherein the preset ratio is a negative ratio of the active current to the reactive current output by the power conversion circuit, or a negative ratio of an active current instruction to a reactive current instruction in the second current instruction.

10. The power converter according to claim 5, wherein the controller is further configured to:

in response to that the amplitude of the first current instruction is not greater than the current instruction threshold, control the output virtual impedance of the power conversion circuit to be zero.

11. A method for controlling a power converter, wherein the power converter comprises a power conversion circuit, an input of the power conversion circuit is configured to connect to a direct current power supply, an output of the power conversion circuit is coupled to an alternating current grid through a grid connection point, and the power conversion circuit is configured to output an alternating current to the alternating current grid; and the method comprises:

when a voltage at the grid connection point is within a preset voltage range, controlling the power converter to work in a steady-state mode, wherein in the steady-state mode, an amplitude of a current output by the power conversion circuit is not greater than a first current threshold; and when the voltage at the grid connection point exceeds the preset voltage range:

after an amplitude of a voltage output by the power conversion circuit is not greater than a voltage threshold, controlling the power converter to work in a transient voltage stabilization mode, wherein, in the transient voltage stabilization mode, the amplitude of the current output by the power conversion circuit is not greater than a second current threshold, the second current threshold is greater than the first current threshold, and a ratio of an active current to a reactive current output by the power conversion circuit is constant or changes; and after the amplitude of the voltage output by the power conversion circuit is greater than the voltage threshold, controlling the power converter to work in a transient voltage regulation mode, wherein, in the transient voltage regulation mode, the amplitude of the current output by the power conversion circuit is identically equal to the second current threshold, and the ratio of the active current to the reactive current output by the power conversion circuit changes.

12. The method according to claim 11, further comprising:

after the amplitude of the voltage output by the power conversion circuit is greater than the voltage threshold, controlling the power converter to work in the transient voltage regulation mode; and in the transient voltage regulation mode:

after an absolute value of a difference between the amplitude of the voltage output by the power conversion circuit and the voltage threshold increases, controlling the ratio of the active current to the reactive current to decrease; and after the absolute value of the difference between the amplitude of the voltage output by the power conversion circuit and the voltage threshold decreases, controlling the ratio of the active current to the reactive current to increase.

13. The method according to claim 11, wherein the direct current power supply comprises an energy storage battery, and the method further comprises:

after the power converter outputs an alternating current to the alternating current grid based on a direct current output by the energy storage battery, and the amplitude of the voltage output by the power conversion circuit is greater than the voltage threshold, controlling the power converter to work in the transient voltage regulation mode; and in the transient voltage regulation mode:

after an absolute value of a difference between the amplitude of the voltage output by the power conversion circuit and the voltage threshold increases, controlling the ratio of the active current to the reactive current to decrease; and after the absolute value of the difference between the amplitude of the voltage output by the power conversion circuit and the voltage threshold decreases, controlling the ratio of the active current to the reactive current to increase.

14. The method according to claim 11, wherein the direct current power supply comprises an energy storage battery, and the method further comprises:

after the power converter outputs a direct current to the energy storage battery based on an alternating current output by the alternating current grid, and the amplitude of the voltage output by the power conversion circuit is greater than the voltage threshold, controlling the power converter to work in the transient voltage regulation mode; and in the transient voltage regulation mode:

after an absolute value of a difference between the amplitude of the voltage output by the power conversion circuit and the voltage threshold increases, controlling the ratio of the active current to the reactive current to increase; and after the absolute value of the difference between the amplitude of the voltage output by the power conversion circuit and the voltage threshold decreases, controlling the ratio of the active current to the reactive current to decrease.

15. The method according to claim 12, further comprising:

generating a first current instruction through a voltage loop based on the voltage output by the power conversion circuit and an initial voltage instruction;

after an amplitude of the first current instruction is greater than a current instruction threshold and the amplitude of the first current instruction decreases, controlling an output virtual impedance of the power conversion circuit to decrease;

after the amplitude of the first current instruction is greater than the current instruction threshold and the amplitude of the first current instruction increases, controlling the output virtual impedance of the power conversion circuit to increase, to update the initial voltage instruction based on a decreased or increased virtual impedance;

generating, through a circular limiter based on the first current instruction, a second current instruction whose amplitude is the current instruction threshold, and inputting the second current instruction into a current loop, wherein a ratio of an active current to a reactive current in the first current instruction is the same as a ratio of an active current to a reactive current in the second current instruction; and generating, through the current loop based on the second current instruction and the current output by the power conversion circuit, a modulation voltage signal to control the power conversion circuit.

16. The method according to claim 13, further comprising:

generating a first current instruction through a voltage loop based on the voltage output by the power conversion circuit and an initial voltage instruction;

after an amplitude of the first current instruction is greater than a current instruction threshold and the amplitude of the first current instruction decreases, controlling an output virtual impedance of the power conversion circuit to decrease;

after the amplitude of the first current instruction is greater than the current instruction threshold and the amplitude of the first current instruction increases, controlling the output virtual impedance of the power conversion circuit to increase, to update the initial voltage instruction based on a decreased or increased virtual impedance;

generating, through a circular limiter based on the first current instruction, a second current instruction whose amplitude is the current instruction threshold;

inputting the second current instruction into a current loop, wherein a ratio of an active current to a reactive current in the first current instruction is the same as a ratio of an active current to a reactive current in the second current instruction; and generating, through the current loop based on the second current instruction and the current output by the power conversion circuit, a modulation voltage signal to control the power conversion circuit.

17. The method according to claim 14, further comprising:

generating a first current instruction through a voltage loop based on the voltage output by the power conversion circuit and an initial voltage instruction;

after an amplitude of the first current instruction is greater than a current instruction threshold and the amplitude of the first current instruction decreases, controlling an output virtual impedance of the power conversion circuit to decrease;

after the amplitude of the first current instruction is greater than the current instruction threshold and the amplitude of the first current instruction increases, controlling the output virtual impedance of the power conversion circuit to increase, to update the initial voltage instruction based on a decreased or increased virtual impedance;

generating, through a circular limiter based on the first current instruction, a second current instruction whose amplitude is the current instruction threshold;

inputting the second current instruction into a current loop, wherein a ratio of an active current to a reactive current in the first current instruction is the same as a ratio of an active current to a reactive current in the second current instruction; and generating, through the current loop based on the second current instruction and the current output by the power conversion circuit, a modulation voltage signal to control the power conversion circuit.

18. The method according to claim 15, further comprising:

adjusting an output virtual inductive reactance of the power conversion circuit, to enable a ratio of the virtual inductive reactance to a virtual inductive reactance reference value to be a difference between 1 and an overcurrent ratio, wherein the overcurrent ratio is equal to a ratio of the current instruction threshold to the amplitude of the first current instruction, and the output virtual inductive reactance is an imaginary part of the output virtual impedance; and adjusting an output virtual resistance of the power conversion circuit, to enable a ratio of the virtual resistance to the virtual inductive reactance to be equal to a preset ratio or a preset expression, wherein the output virtual resistance is a real part of the output virtual impedance, and the preset ratio is a negative ratio of the active current to the reactive current output by the power conversion circuit or a negative ratio of an active current instruction to a reactive current instruction in the second current instruction.

19. The method according to claim 15, further comprising:

after the amplitude of the first current instruction is not greater than the current instruction threshold, controlling the output virtual impedance of the power conversion circuit to be zero.

* * * * *